United States Patent
Grieve

(10) Patent No.: US 8,595,167 B1
(45) Date of Patent: Nov. 26, 2013

(54) PREDICTING LIKELIHOOD OF A SUCCESSFUL CONNECTION BETWEEN UNCONNECTED USERS WITHIN A SOCIAL NETWORK USING A LEARNING NETWORK

(75) Inventor: Andrew Grieve, Waterloo (CA)

(73) Assignee: Google Inc., Mountain View, CA (US)

( * ) Notice: Subject to any disclaimer, the term of this patent is extended or adjusted under 35 U.S.C. 154(b) by 435 days.

(21) Appl. No.: 12/956,510

(22) Filed: Nov. 30, 2010

(51) Int. Cl.
*G06F 17/00* (2006.01)

(52) U.S. Cl.
USPC .......................................................... 706/45

(58) Field of Classification Search
USPC ................................. 706/12, 20, 45; 705/319
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0144034 A1* | 6/2009 | Simma et al. ..................... 703/2 |
| 2011/0098156 A1 | 4/2011 | Ng et al. | |
| 2011/0191142 A1* | 8/2011 | Huang et al. ................. 705/7.33 |

FOREIGN PATENT DOCUMENTS

WO WO02079984 10/2002

OTHER PUBLICATIONS

Aljandal, Waleed, et al. "Ontology-aware classification and association rule mining for interest and link prediction in social networks." AAAI 2009 Spring Symposium on Social Semantic Web: Where Web. vol. 2. 2009.*

Yin, Z., Gupta, M., Weninger, T., & Han, J. (Aug. 2010). A unified framework for link recommendation using random walks. In Advances in Social Networks Analysis and Mining (ASONAM), 2010 International Conference on (pp. 152-159). IEEE.*

(Continued)

*Primary Examiner* — David Vincent
(74) *Attorney, Agent, or Firm* — Patent Law Works LLP

(57) ABSTRACT

A system and method for suggesting love interests and friendships based on inferred information to users within a social network is disclosed. Data is retrieved from a database. The database includes data from users that achieved relationships. The data also includes a list of each user's connections, the user's activities on the social network and the user's interests. The data is input into a network and the network is trained to predict a likelihood of a successful connection. Data from unconnected users is retrieved and put into the trained network to predict a possible relationship. A connection suggestion is sent to the two unconnected users.

20 Claims, 9 Drawing Sheets

(56) References Cited

OTHER PUBLICATIONS

Lichtenwalter, R. N., Lussier, J. T., & Chawla, N. V. (Jul. 2010). New perspectives and methods in link prediction. In Proceedings of the 16th ACM SIGKDD international conference on Knowledge discovery and data mining (pp. 243-252). ACM.*

The 2010 International Conference on Advances in Social Networks Analysis and Mining ASONAM 2010 Aug. 9-11, 2010, Odense, Denmark, pp. 1-2.*

Borzymek, P., Sydow, M., & Wierzbicki, A. (Jun. 2009). Enriching trust prediction model in social network with user rating similarity. In Computational Aspects of Social Networks, 2009. CASON'09. International Conference on (pp. 40-47).*

Aljandal, Waleed, et al. "Ontology-aware classification and association rule mining for interest and link prediction in social networks." AAAI 2009 Spring Symposium on Social Semantic Web: Where Web. vol. 2. 2009, pp. 1-6.*

Adamic et al., "A Social Network Caught in the Web," Internet Journal, First Monday, Jun. 2, 2003, pp. 1-22, vol. 8, No. 6.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

ATt&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

| User Pair | Attribute | | Relationship Status | Relationship Score |
|---|---|---|---|---|
| User A | Age | 24 | Friend | 0.75 |
| | Sex | M | | |
| | Interest 1 | Rock Music | | |
| | Interest 2 | Photography | | |
| | Like 1 | Biking | | |
| | Like 2 | Say no to drugs | | |
| | ... | ... | | |
| User B | Age | 30 | | |
| | Sex | F | | |
| | Interest 1 | Jazz | | |
| | Interest 2 | Photography | | |
| | Like 1 | I love coffee | | |
| | Like 2 | Let's play | | |
| | ... | ... | | |

Figure 5

PREDICTING LIKELIHOOD OF A SUCCESSFUL CONNECTION BETWEEN UNCONNECTED USERS WITHIN A SOCIAL NETWORK USING A LEARNING NETWORK

FIELD OF THE INVENTION

The present invention relates to social networks. In particular, the present invention relates to suggesting connections to users within a social network. Still more particularly, the present invention relates to suggesting love interests and friendships based on inferred information to users within a social network.

BACKGROUND

Social networks are becoming an increasingly popular way for people to stay connected and develop new friendships. This increasing popularity of social networks has given rise to many social network services that have developed various ways users of the social network can communicate and stay connected. Users within a social network can send each other messages, monitor other users' activities on a daily basis, share interests and discuss common topics. Social networking services have provided a great forum for users to remain in close contact despite geographic distance or uncoordinated schedules.

Some social networking services attempt to provide the ability to make new connections based on existing connections and mutual connections. For example, if two users are connected to the same person, a suggestion might be sent to the two users to connect with each other. The suggestions sent to the users in this example are the result of a direct comparison of the users' social graphs. Thus, if two users have a common friend (or many common friends) then perhaps those two users know each other or would like to know each other.

Other social networking services attempt to provide the ability to make new connections by connecting users who have similar interests. For example, on-line dating and matchmaking services provide ways for users to connect with each other based on common and/or similar interests. For example, if one person likes horseback riding and going to the movies, they may be interested in meeting another person who also likes horseback riding a going to the movies. In this example, connection suggestions are the result of a comparison of the explicitly declared interests input by users.

Existing social network services therefore provide ways users can connect with each other through a comparison of users' social graphs (connections) or users' information. However, absent the mutual connection or common interests correlations mentioned above, two users who might end up forming a successful connection may never be connected.

SUMMARY OF THE INVENTION

The present invention overcomes the deficiencies and limitations of the prior art at least in part by providing a system and method for suggesting loves interests or friends based on inferred information.

The present invention provides a system for suggesting love interests and friendships based on inferred information to users within a social network. The system includes an inferred interest module and a storage device that stores information related to users of the social network. The inferred interest module retrieves data from a database. The database includes data of users that achieved relationships. The data also includes a list of each user's connections, the user's activities on the social network and the user's interests. The system inputs the data into a network and trains the network to predict a likelihood of a successful connection. The system retrieves data from unconnected users and inputs the data into the trained network to predict a possible relationship. The system sends a connection suggestion to unconnected users based on the predictions.

In one embodiment, data is retrieved from a database. The database includes data of users that achieved relationships. The data also includes a list of each user's connections, the user's activities on the social network and the user's interests. The data is put into a network and the network is trained to predict a likelihood of a successful connection. Data from unconnected users is retrieved and put into the trained network to predict a possible relationship. A second set of data is input into the system in order to validate the accuracy of the trained network. A connection suggestion is sent to unconnected users based on the prediction.

BRIEF DESCRIPTION OF THE DRAWINGS

The invention is illustrated by way of example, and not by way of limitation in the figures of the accompanying drawings in which like reference numerals are used to refer to similar elements.

FIG. 5 is a diagram illustrating exemplary pre-processed input/output data pairs of users of the social network system according to one embodiment of the present invention.

DETAILED DESCRIPTION

Figure 1:
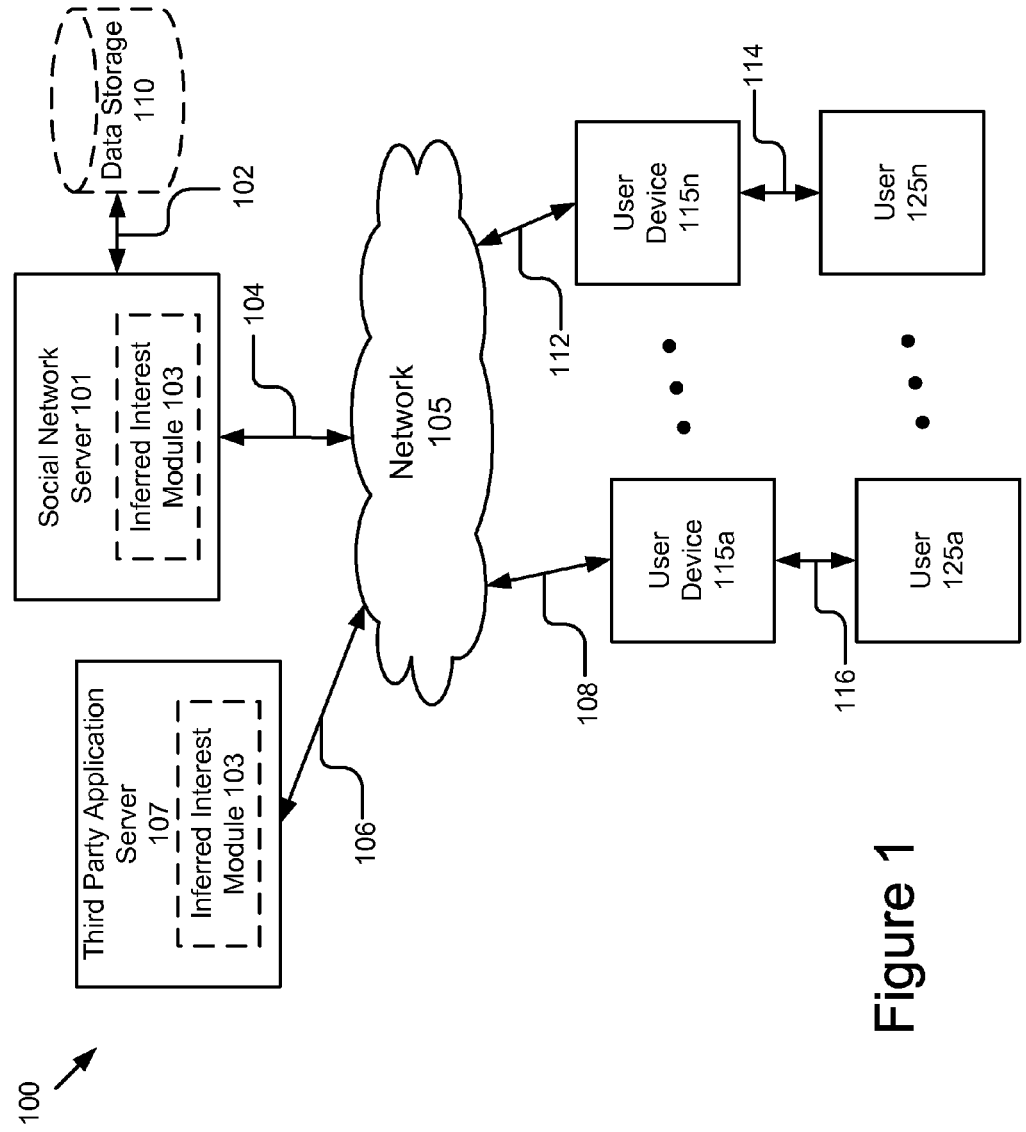
FIG. 1 is a block diagram illustrating a social network system according to one embodiment of the present invention.

A system and method for suggesting love interests or friends based on signals is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus. Additional details illustrating the components of such an apparatus are explained in further detail below in the descriptions of FIGS. 2 and 3.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a social network system 100 according to one embodiment of the present invention. A social network system 100 is any type of social structure where the users are connected by a common feature. Examples include, but are not limited to, Orkut, Buzz, blogs, microblogs, and Internet forums. The common feature includes friendship, family, a common interest, etc.

The illustrated invention of a social network system 100 includes user devices 115a, 115n that are accessed by users 125a, 125n, a social network server 101 and a third party application server 107. In some embodiments, the social network system 100 includes a separate data storage 110 that is coupled to the social network server 101 via signal line 102. In the illustrated embodiment, these entities are communicatively coupled via a network 105. The user devices 115a, 115n in FIG. 1 are used by way of example. While FIG. 1 illustrates two devices, the present invention applies to any system architecture having one or more user devices. For example, the system 100 may include millions of users 125 and user devices 115, and users may share user devices. Furthermore, while only one network 105 is coupled to the user devices, 115a, 115n, the social network server 101 and the third party application 107, in practice any number of networks 105 can be connected to the entities. Additionally, for the purposes of illustration, FIG. 1 shows one social network server 101 and one third party application server 107. However, in other embodiments, there may exist a plurality of social network servers 101 and third party application servers 107.

The network 105 enables communications between user devices 115a, 115n, the social network server 101 and the third part application 107. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment of the present invention, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial- or satellite-based transceivers). In one embodiment of the present invention, the network 105 is an IP-based wide or metropolitan area network.

In some embodiments, the network 105 helps to form a set of online relationships between users 125a, 125n, such as provided by one or more social networking systems, such as social network system 100, including explicitly-defined relationships and relationships implied by social connections with other online users, where the relationships form a social graph. In some examples, the social graph can reflect a mapping of these users and how they are related.

In one embodiment, the inferred interest module 103 is operable on the social network server 101. In another embodiment, the inferred interest module 103 is operable on a third-party application server 107. Persons of ordinary skill in the art will recognize that the inferred interest module 103 can be stored in any combination on the devices and servers. In some embodiments the inferred interest module 103 includes multiple, distributed modules that cooperate with each other to perform the functions described below. Details describing the functionality and components of the inferred interest module 103 will be explained in further detail below with regard to FIG. 4.

In the illustrated embodiment, the user device 115a is coupled to the network 105 via signal line 108. The user 125a is communicatively coupled to the user device 115a via signal line 116. Similarly, the user device 115n is coupled to the network via signal line 112. The user 125n is communicatively coupled to the user device 115n via signal line 114. The third party application 107 is communicatively coupled to the network 105 via signal line 106. The social network server 101 is communicatively coupled to the network 105 via signal line 104. In one embodiment, the social network server 101 is communicatively coupled to data storage 110 via signal line 102.

In one embodiment, data storage 110 stores data and information of users 125a/125n of the social network system 100. Such stored information includes user profiles and other information identifying the users 125a/125n of the social network system 100. Examples of information identifying users includes, but is not limited to, the user's name, contact information, sex, relationship status, likes, interests, links, education and employment history, location, political views, and religion. In one embodiment, the information stored in data storage 110 also includes the user's list of current and past friends and the user's activities within the social network system 100, such as anything the user posts within the social network system 100 and any messages that the user sends to other users. In another embodiment, which will be discussed below, a storage device 214 (see FIG. 2) is included in the social network server 101.

In one embodiment, the user device 115a, 115n is an electronic device having a web browser for interacting with the social network server 101 via the network 105 and is used by user 125a, 125n to access information in the social network system 100. The user device 115a, 115n can be, for example, a laptop computer, a desktop computer, a tablet computer, a mobile telephone, a personal digital assistant (PDA), a mobile email device, a portable game player, a portable music player, a portable music player, or any other electronic device capable of accessing a network.

Social Network Server 101

Figure 2:
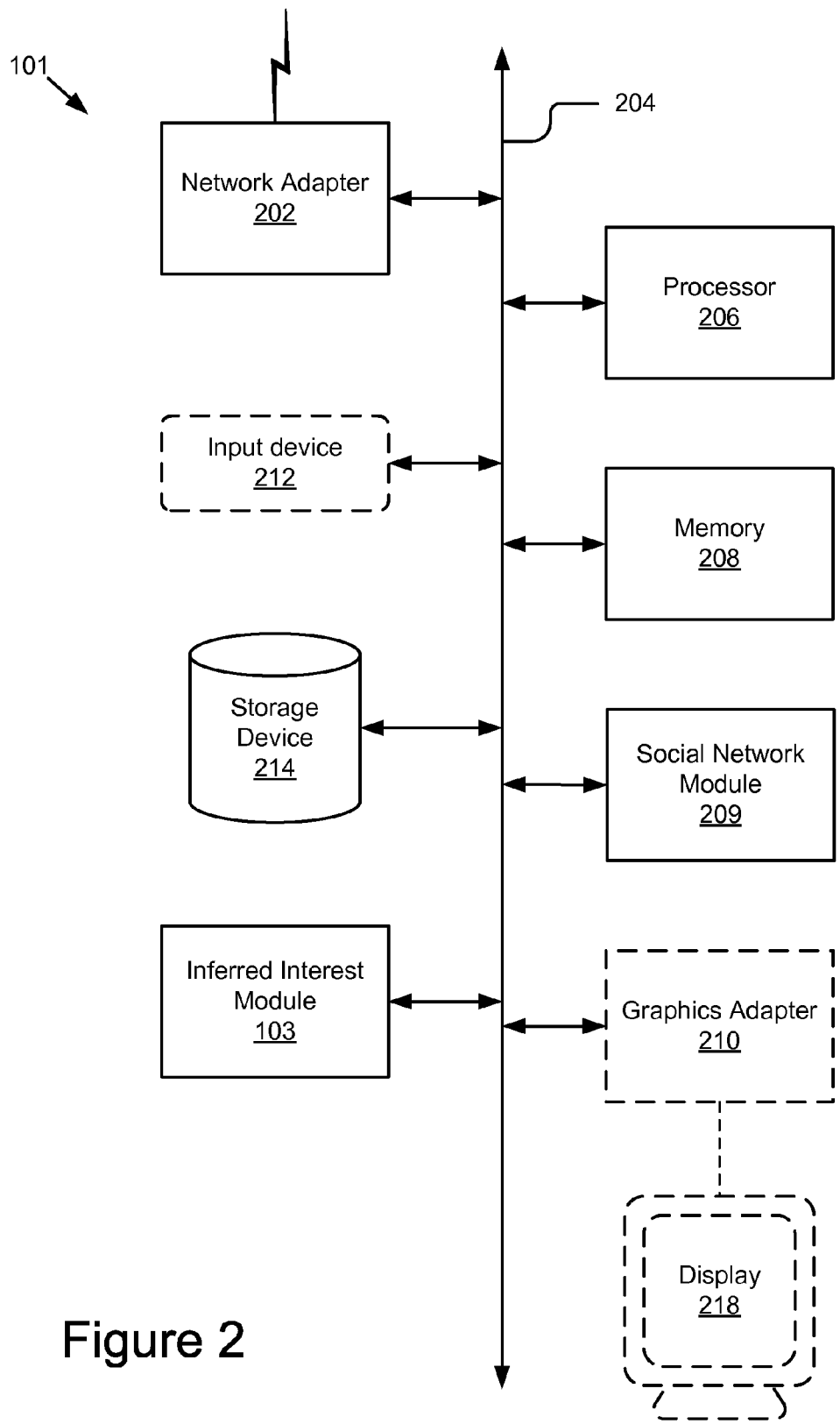
FIG. 2 is a block diagram of an embodiment of a social network server in accordance with the present invention.

FIG. 2 is a block diagram of an embodiment of a social network server 101 in accordance with the present invention. As illustrated in FIG. 2, social network server 101 includes a network adapter 202 coupled to a bus 204. According to one embodiment, also coupled to the bus 204 are at least one processor 206, memory 208, a social network module 209, a graphics adapter 210, an input device 212, a storage device 214, and the inferred interest module 103. In one embodiment, the functionality of the bus 204 is provided by an interconnecting chipset. The social network server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the social network server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the social network server 101. In one embodiment, the inferred interest module 103 is stored in memory 208 and executable by the processor 206.

The social network module 209 is software and routines executable by the processor 206 to control the interaction between the social network system 101, storage device 214 and the user device 115a/115n. An embodiment of the social network module 209 allows users 125/125n of user devices 115a/115n to perform social functions between other users 125/125n of user devices 115a/115n within the social network system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125/125n of the social network system 100. In some embodiments, such user data is stored in storage device 214. In other embodiments, such user data is stored in data storage 110. In yet other embodiments, the user data is stored both is storage device 214 and data storage 110.

The input device 212 may include a mouse, track ball, or other type of pointing device to input data into the social network server 101. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 318 represents any device equipped to display electronic images and data as described herein. The network adapter 202 couples the social network server 101 to a local or wide area network.

The inferred interest module 103 is software and routines executable by the processor 206 to control the interaction between the social network system 101, storage device 214 and the user device 115a/115n. An embodiment of the inferred interest module 103 retrieves data from storage device 214 of the social network sever 101 and uses that data to train a network to predict future relationships. The inferred interest module 103 uses trained network predict future relationships and output connection suggestions to user device 115a/115n and users 125a/125n of the social network system 100. Details describing the functionality and components of the inferred interest module 103 will be explained in further detail below with regard to FIG. 4.

As is known in the art, a social network server 101 can have different and/or other components than those shown in FIG. 2. In addition, the social network server 101 can lack certain illustrated components. In one embodiment, a social network server 101 lacks an input device 212, graphics adapter 210, and/or display 218. Moreover, the storage device 214 can be local and/or remote from the social network server 101 (such as embodied within a storage area network (SAN)).

As is known in the art, the social network server 101 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Inferred Interest Module 103

Figure 3:
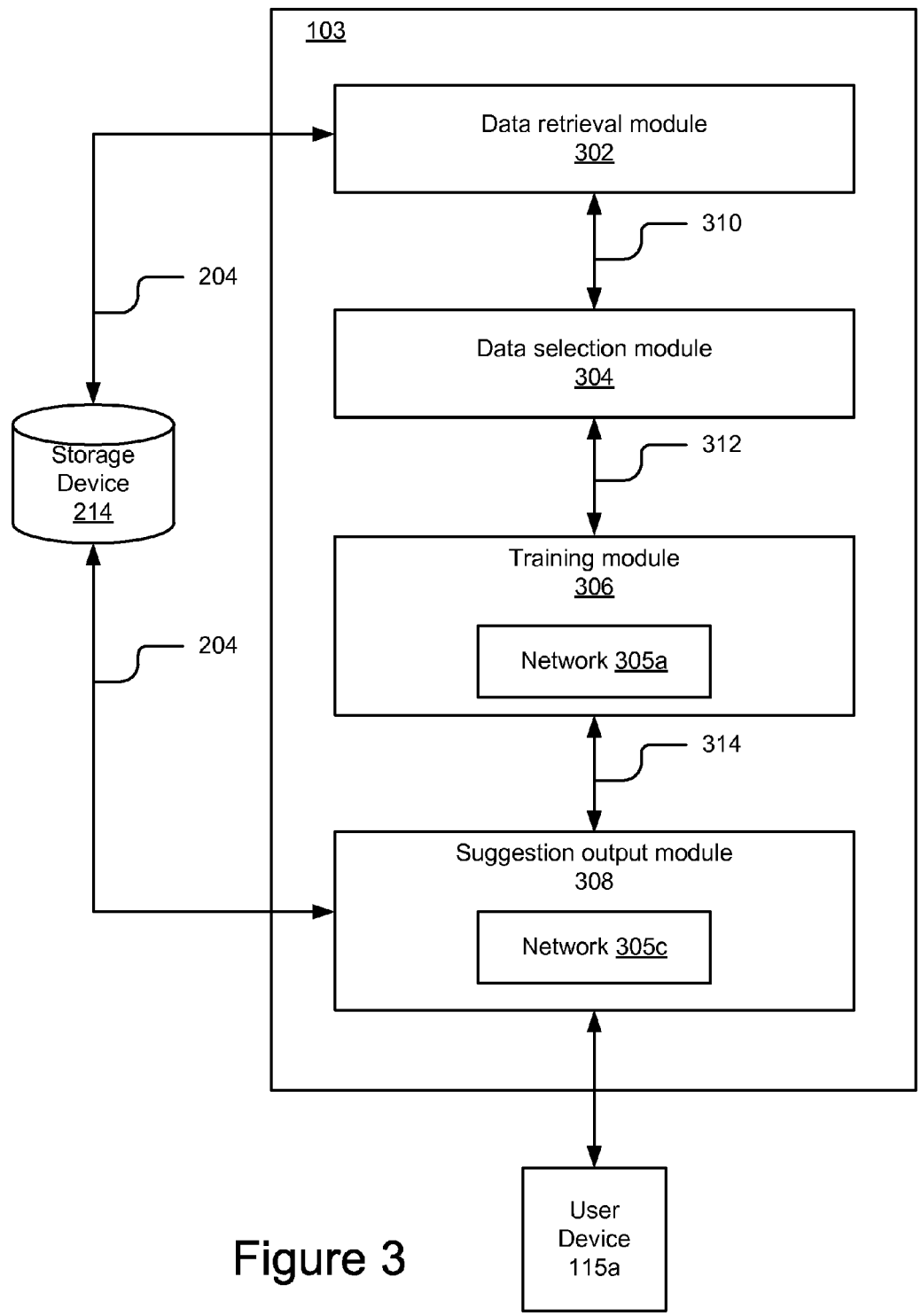
FIG. 3 is a block diagram illustrating an inferred interest module according to one embodiment of the present invention

FIG. 3 is a block diagram illustrating components of the inferred interest module 103 according to one embodiment. As stated above, in one embodiment, the inferred interest module 103 is software and routines executable by the processor 206 to control the interaction between the social network system 101, and the user device 115a/115n. The inferred interest module 103 is communicatively coupled to storage device 214 via signal line 204. In one embodiment, the inferred interest module 103 includes a data retrieval module 302, a data selection module 304, a network 305a/305c, a training module 306, and a suggestion output module 308.

An embodiment of the inferred interest module 103 retrieves data from storage device 214 of the social network server 101 and uses that data to train a network to predict future relationships. Furthermore, the inferred interest module 103 uses a trained network 305 to predict future relationships and output connection suggestions to users of the social network system 100. Some embodiments have different and/or additional modules than those shown in FIG. 3. Moreover, the functionalities can be distributed among the modules in a different manner.

The data retrieval module 302 is software and routines executable by the processor 206 to control the interaction between the inferred interest module 103 and storage device 214. The data retrieval module 302 of the inferred interest module 103 is communicatively coupled to storage device 214 via signal line 214 and retrieves data contained in storage device 214 via signal line 214. The data that is retrieved from storage device 214 includes information about users of the social network system 100. Such information includes, but is not limited to, the user's identifying information, relationship status, likes, interests, links, education and employment history, location, political views, religion, and other information related to the user. The information also includes the user's list of friends and the user's activities within the social network system 100. Such activities may include messages that the user sends to other users or comments that the user has posted in the social network system 100. In one embodiment, the data retrieval module 302 retrieves data from users who have achieved relationships, in other words, users who are directly connected within the social network system 100. According to an alternate embodiment, the data retrieval module 302 retrieves data from social network application or a user social network application programming interface (API).

In one embodiment, the data of the data retrieval module 302 is sent to the data selection module 304 via signal line 310. The data selection module 304 is software and routines executable by the processor 306 to perform data selection of the data within the inferred interest module 103. The data selection module 304 selects data from connected users and pre-processes the data into data sets; examples of which are illustrated in FIG. 5. This data represents historical data and includes data of users who have achieved relationship, in other words, users who have a direct connection within the social network system 100.

FIG. 5 is a diagram illustrating exemplary pre-processed input/output data sets of users of the social network system 100 according to one embodiment of the present invention. As seen in FIG. 5, the data sets are organized to compare two users who are directly connected, in other words, two users who have an existing relationship status. In the example illustrated in FIG. 5, User A and User B are friends. The pre-processed data is organized in such a way to allow the comparison of one user's attributes to the other user's attributes. Other possible relationship status descriptions include, but are not limited to, married, in a relationship, co-worker, colleague, and engaged.

Marriage and statuses indicating specific non-platonic relationships would be used to predict possible love interests. According to one embodiment, for the purposes of training the network 305, a successful love connection is defined as a relationship status of "married," "in a committed relationship," "engaged," or other similar relationship. In some embodiments, the duration of the relationship status is known. In such embodiments, the duration of the relationship status is one parameter that effects a relationship score, which will be discussed in more detail below.

In one embodiment, the data set includes a relationship score. In some embodiments, the relationship score is based on the interaction between the users. For example, the relationship score increases as the number of messages a user sends to another user increases. As another example, the relationship score also increases as the frequency of comments one user posts on another user's profile increases. Conversely, the score decreases if the two users have no activity of interaction, or if the two users are no longer connected.

According to one embodiment, the duration of the relationship status is known and the score increases as the duration of the relationship increases. According to another embodiment, the relationship score increases as the number of the same events attended increases. According to yet another embodiment, the number of mutual friends between two users effects the relationship score; the higher the number of mutual friends, the higher the relationship score. According to one embodiment, if two users have the same address, the relationship score is increased. In another embodiment, changes in the relationship status between two users effect the relationship score. For example, if two users were previously in a relationship, then no longer in that relationship, and then subsequently in a relationship again, the relationship score would decrease.

The training module 306 is software and routines to train a network 305 to predict future relationships based on historical data. The training module 306 takes a collection of input data from the data selection module 304 and estimates a relationship. The estimate is then compared to the actual relationship generating a training signal. That training signal is then used by an algorithm to strengthen or weaken input connections in the network 305. The network 305 and its algorithms may include, but is not limited to, a Bayesian network, a genetic algorithm, decision tree learning, association rule learning, artificial neural networks, inductive logic programming, support vector machines, clustering and reinforcement learning. In one embodiment, for example, the training signal would be used to predict edges in the current graph that should exist but do not.

In one embodiment, in order to be adequately and effectively trained, the network 305 analyzes the data sets and takes into consideration both the comparison of the users' attributes and the relationship score. For example, successful and closer friendships have higher relationship scores. In one embodiment, the attributes are the input signals, and the relationship score is a success indicator.

The suggestion output module 308 is software and routines to control the interaction between the social network server 101 and inferred interest module 103 and utilize information from unconnected users to predict possible connections. The suggestion output module 308 retrieves data from users who are not yet connected within the social network system 100 via signal line 314 from storage device 214. In one embodiment, the suggestion output module 308 applies the trained network 205 created by the training module 306 to predict possible connections and is connected to the training module 306 via signal line 314.

Figure 6:
FIG. 6 is a diagram illustrating exemplary pre-processed input data of users of the social network system according to one embodiment of the present invention.

FIG. 6 is a diagram illustrating exemplary pre-processed input data of users of the social network system according to one embodiment of the present invention. Unlike the data set illustrated in FIG. 5, the data set input to the suggestion output module 308 are of users who do not yet have a direct connection within the social network system 100. The data sets are organized to compare the attributes of two users who are not connected. In the example illustrated in FIG. 5, User A and User B have an unknown or non-existent relationship status. The pre-processed data is organized in such a way to allow the comparison of one user's attributes to the other user's attributes in order to use the trained network to predict whether those two users should connect.

In one embodiment, if the network predicts that two users should connect, a suggestion is sent to one user. In such embodiments, in order to determine which user should receive the suggestion, the suggestion output module 308 looks at the users' activity. In some embodiments, the user who is more active (shows more posts or sends more messages) is sent the connection suggestion. In other embodiments, if the network predicts that two users should connect, a suggestion is sent to both users.

Figure 4:
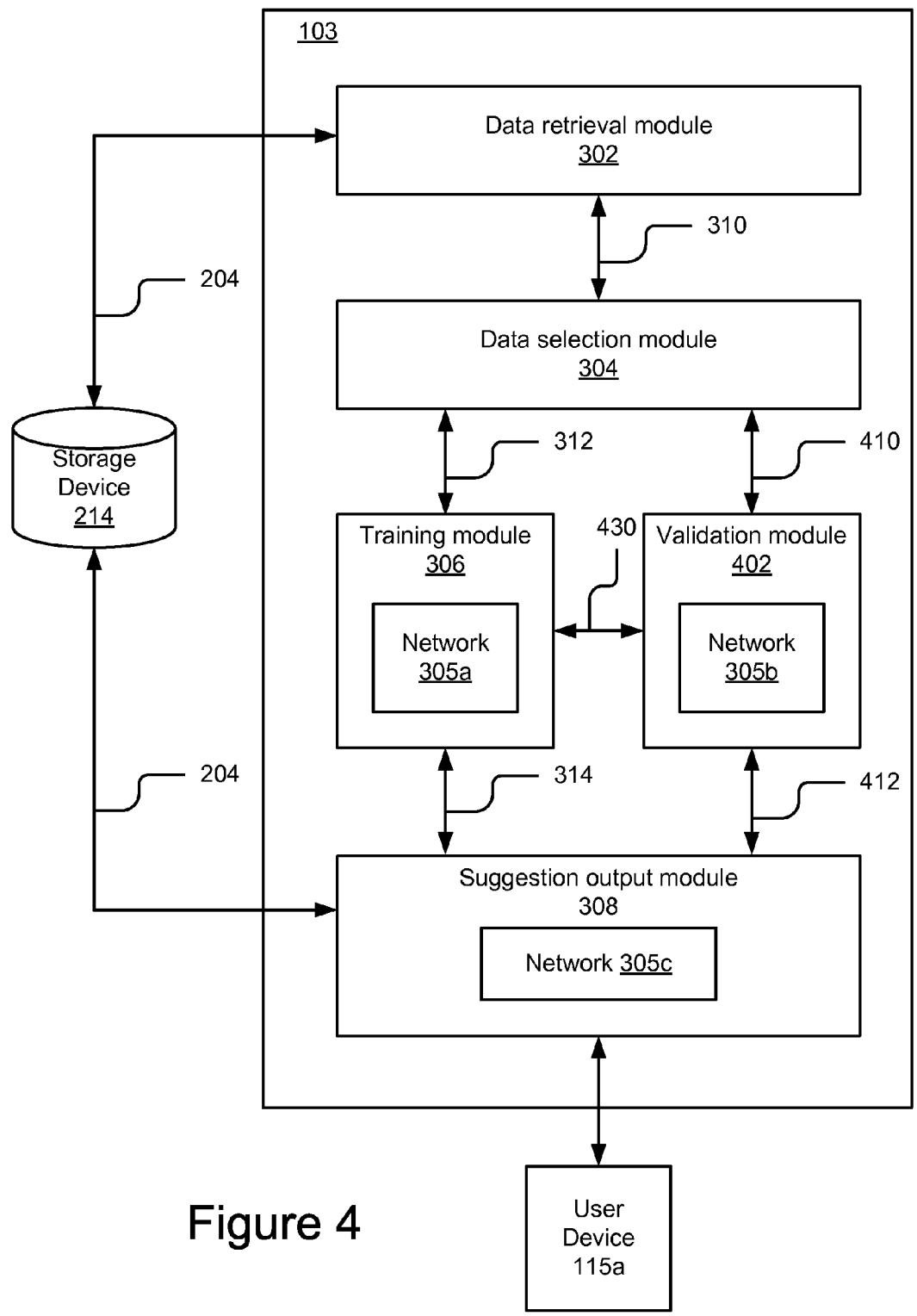
FIG. 4 is a block diagram illustrating the inferred interest module according to another embodiment of the present invention.

FIG. 4 is a block diagram illustrating components of the inferred interest module 103 according to another embodiment of the present invention. According to this embodiment, the training module 306 trains a network 305a. In one embodiment, the network 305a is validated by the validation module 402. In this embodiment, the data selection module 304 divides the data into two sets; one set is the input to the training module 306, and the other set is the input to the validation module 402. Conversely, in the embodiment discussed above, the there is no division of data and the selected data is input into the training module 306. In such embodiments, the training module 306 creates a trained network 305, which is directly used by the suggestion output module 308 and not validated by the validation module 402.

According to one embodiment, the data retrieval, selection and division steps mentioned above are performed by one module. For example, according to such embodiments, the data retrieval module 302 selectively retrieves data from users who are already connected and pre-processes the data into the data sets as illustrated in FIG. 5. According to this embodiment, the data retrieval module 302 divides the data into two sets to be input to the training module 306 and validation module 402 respectively. According to these embodiments, the data selection module 304 is therefore not needed.

The validation module 402 is software and routines to validate the trained network 305 created by the training module 306 in order to confirm the prediction accuracy and generalization performance of the network 305. The validation module 402 utilizes the data sets originally from storage device 214 that has not been seen by the training module 306. For example, in the embodiment where the data selection module 304 divides the data into two sets, the training module 306 utilizes the first set of data while the validation module 402 utilizes the second set of data. Based on its performance on the input data, a criterion determines whether or not that model should be used, i.e. the error generated as the output of the network is below a certain threshold. A small error would ensure a more accurate trained network 305. The suggestion output module 308 applies the validated model created by the training module 306 and validated by the validation module 402 to predict possible connections.

Method and Exemplary Screenshot

Figure 7:
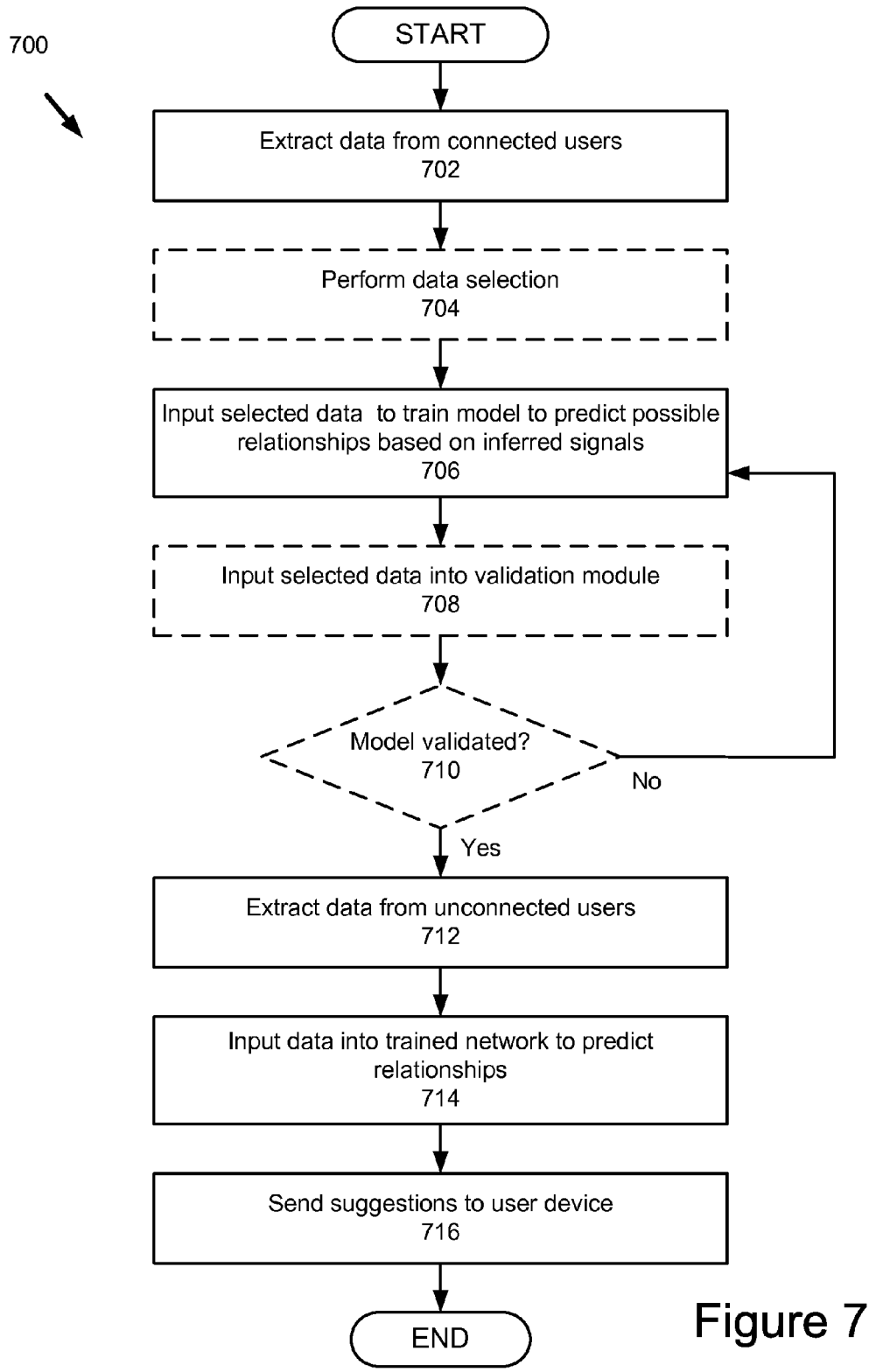
FIG. 7 is a flow chart illustrating an embodiment of a method for suggesting connections in a social network system in accordance with the present invention.

Referring now to FIG. 7, an embodiment of the method of the present invention will be described. Turning to FIG. 7, a flow chart illustrating an embodiment of a method 700 for suggesting connections in a social network system 100 in accordance with the present invention is shown. In addition, reference will be made to the various user interfaces generated by different components of the system 100 as depicted in FIG. 4.

The method is performed by the inferred interest module 103 and begins when data is retrieved 702 from storage device 214 by the data retrieval module 302. In one embodiment, the data selection module 304 performs 704 data selection. The data selection module 304 selects data from connected users and pre-processes the data into data sets, which include historical data of users who have achieved relationship, in other words, users who have a direct connection within the social network system 100. In one embodiment, the selected data is divided into two sets, one to be input into the training module 306 and one to be input into validation module 402.

Subsequently, selected data is input 706 into the training module 306 that trains a network to predict possible relationships based on inferred signals. The network and its algorithms may include, but is not limited to, a Bayesian network, a genetic algorithm, decision tree learning, association rule learning, artificial neural networks, inductive logic programming, support vector machines, clustering and reinforcement learning.

In some embodiments where the data is divided into two sets, a second set, is optionally input 708 into a validation module 402. The validation module 402 uses the second set of data to validate the accuracy of the trained network 305. An inquiry 710 is made as to whether the network 305 has been properly trained. If the network 305 has not yet been properly trained (710-No), addition data is input 706 into the training module 306 in order to continue training the network.

If the network has been successfully trained (710-Yes), additional data from users of the social network 100 who are not yet connected is retrieved 712 by the output suggestion module 410. The selected data is input 714 into the trained network to predict relationships. If a possible relationship is found, a connection suggestion is sent 716 to a user device 115a/155b of the social network system 100.

Figure 8:
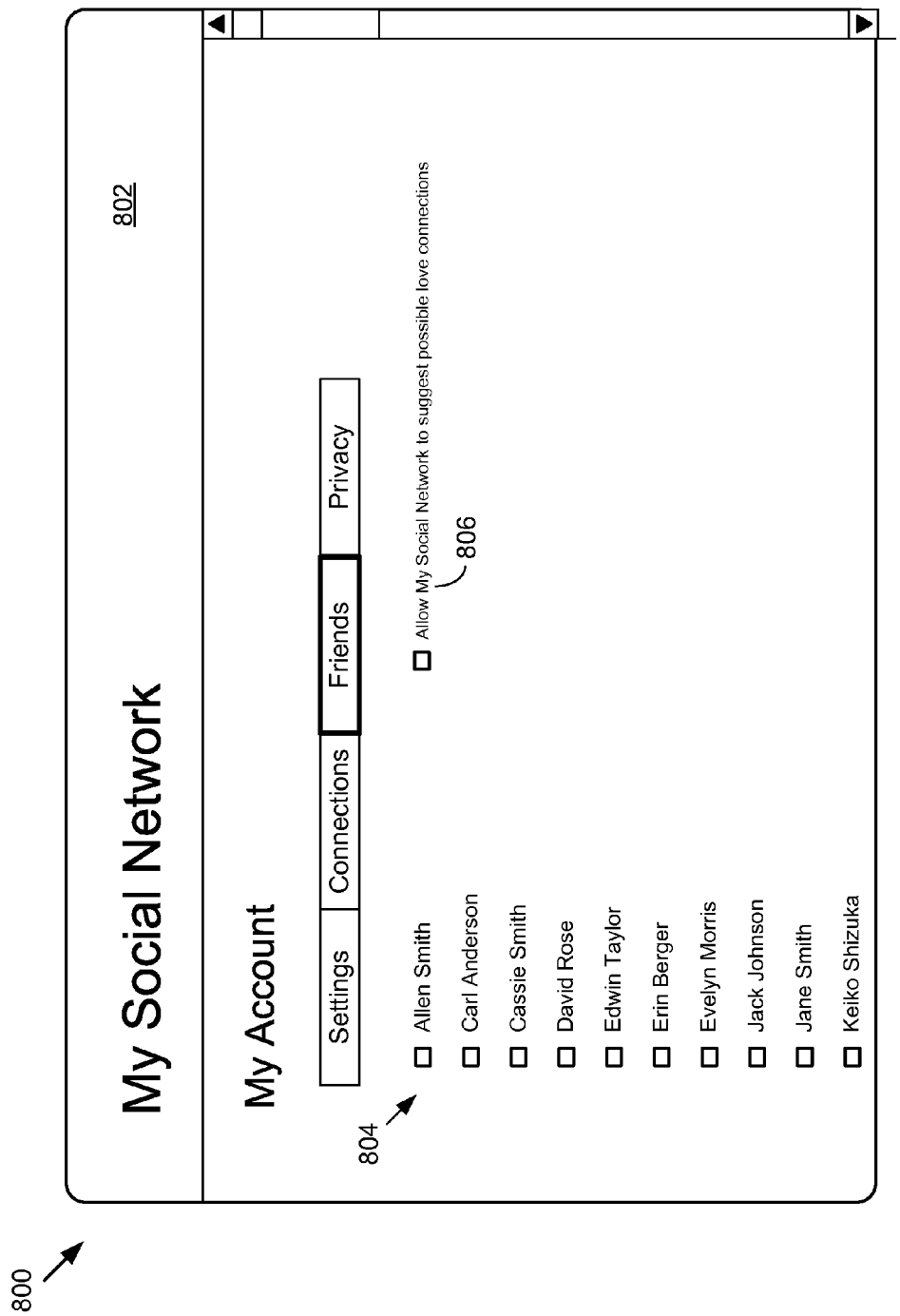
FIG. 8 is a graphic representation of an exemplary user interface showing one aspect of the present invention according to one embodiment.

FIG. 8 is a graphic representation of an exemplary screenshot 800 showing one aspect of the present invention according to one embodiment. The screenshot 802 shows the "account" area of a "My Social Network" webpage 802. The screenshot 802 includes a Friends list 804 and a checkbox 806 to opt-in for receiving love suggestions from the system 100.

Figure 9:
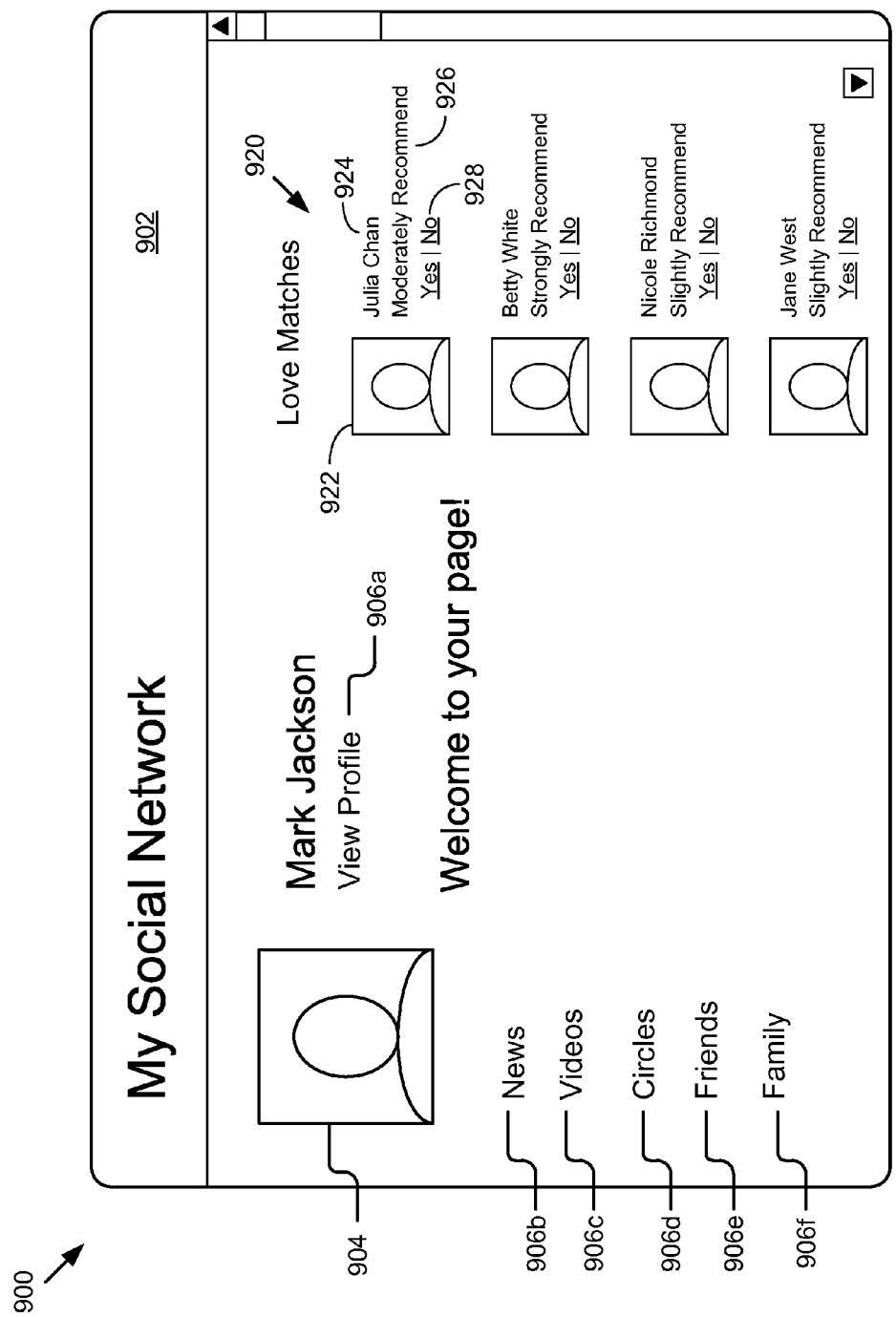
FIG. 9 is a graphic representation of an exemplary user interface showing suggestions for love matches according to one embodiment of the present invention.

FIG. 9 is a graphic representation of an exemplary screenshot 900 showing suggestions for love matches according to one embodiment of the present invention. The screenshot 900 shows a homepage 902 of a user. As illustrated in this embodiment, the homepage 902 includes a profile picture 904, links 906a, 906b, 906c, 906d, 906e and 906f to other webpages within the "My Social Network" website, and love match suggestions 920. The love match suggestions 920 include a love match profile picture 922, a love match name, 924, match recommendation level 926, and a decision button 928. In one embodiment, the match recommendation level 926 indicates the server's 101 degree of confidence that the match will be successful. In one embodiment, this is produced by the inferred interest module 103 based on an analysis of historic data, specifically, based on the relationship score of similar successful love matches.

The foregoing data/information can be collected upon user consent for generating, e.g., prediction models. In some implementations, a user can be prompted to explicitly allow data collection. Further, the user may opt in/out of participating in such data collection activities. Furthermore, the collected data can be anonymized prior to performing the analysis to obtain the various statistical patterns described above.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method of generating a model for predicting a relationship within a social network, the method comprising:

retrieving data from a database, wherein the database includes data of users that are connected in the social network, a list of each user's connections, each user's activities on the social network and each user's interests;

inputting a first set of the data into a learning network;

training the learning network using the first set of the data;

determining whether the learning network is properly trained based on validating accuracy of the learning network using a second set of the data;

in response to determining that the learning network is not properly trained, adding a third set of the data to the learning network and training the learning network using the first set and the third set of the data;

in response to determining that the learning network is properly trained, inputting into the learning network data of users that are unconnected in the social network and predicting a likelihood of a successful connection between the unconnected users; and sending a suggestion to at least two of the unconnected users.

2. The computer-implemented method of claim 1, further including:

pre-processing the retrieved data to compare the data of the connected users.

3. The computer-implemented method of claim 1, further including:

selecting and organizing the first set of data in the learning network.

4. The computer-implemented method of claim 1, wherein sending the suggestion to the unconnected users includes sending the suggestion to one of the unconnected users that has more user activities than other unconnected users in the social network.

5. The computer-implemented method of claim 1, wherein the learning network is selected from a group consisting of: a Bayesian network, a genetic algorithm, decision tree learning, association rule learning, artificial neural networks, inductive logic programming, support vector machines, clustering and reinforcement learning.

6. The computer-implemented method of claim 1, wherein the retrieved data includes a relationship status and a duration of the relationship status.

7. The computer-implemented method of claim 1, further comprising:

generating a relationship score, wherein the relationship score is based on a frequency of user interactions.

8. The computer-implemented method of claim 7, wherein the relationship score is based on a duration of a relationship status.

9. A system for generating a model for predicting a relationship within a social network, the system comprising:

one or more processors; and at least one module, stored in a memory and executed by the one or more processors, the at least one module including instructions for:

retrieving data from a database, wherein the database includes data of users that are connected in the social network, a list of each user's connections, each user's activities on the social network and each user's interests;

inputting a first set of the data into a learning network;

training the learning network using the first set of the data;

determining whether the learning network is properly trained based on validating accuracy of the learning network using a second set of the data;

in response to determining that the learning network is not properly trained, adding a third set of the data to the learning network and training the learning network using the first set and the third set of the data;

in response to determining that the learning network is properly trained, inputting into the learning network data of users that are unconnected in the social network and predicting a likelihood of a successful connection between the unconnected users; and sending a suggestion to at least two of the unconnected users.

10. The system of claim 9, further including the instructions for:

pre-processing the retrieved data to compare the data of the connected users.

11. The system of claim 9, further including the instructions for:

selecting and organizing the first set of data in the learning network.

12. The system of claim 9, wherein sending the suggestion to the unconnected users includes sending the suggestion to one of the unconnected users that has more user activities than other unconnected users in the social network.

13. The system of claim 9, wherein the learning network is selected from a group consisting of: a Bayesian network, a genetic algorithm, decision tree learning, association rule learning, artificial neural networks, inductive logic programming, support vector machines, clustering and reinforcement learning.

14. The system of claim 9, wherein the retrieved data includes a relationship status and a duration of the relationship status.

15. The system of claim 9, further comprising the instructions for:

generating a relationship score, wherein the relationship score is based on a frequency of user interactions.

16. The system of claim 15, wherein the relationship score is based on a duration of a relationship status.

17. A computer program product comprising a non-transitory computer useable medium including a computer readable program, wherein the computer readable program when executed on a computer causes the computer to:

retrieve data from a database, wherein the database includes data of users that are connected in a social network, a list of each user's connections, each user's activities on the social network and each user's interests;

input a first set of the data into a learning network;

train the learning network using the first set of the data;

determine whether the learning network is properly trained based on validating accuracy of the learning network using a second set of the data;

in response to determining that the learning network is not properly trained, add a third set of the data to the learning network and train the learning network using the first set and the third set of the data;

in response to determining that the learning network is properly trained, input into the learning network data of users that are unconnected in the social network and predict a likelihood of a successful connection between the unconnected users; and send a suggestion to the unconnected users.

18. A graphical user interface for receiving predictions of connections within a social network system based on inferred interests, the graphical user interface including:

an option to allow the social network system to send suggestions of the connections;

a recommendation level associated with a suggestion indicating a degree of confidence that the suggested connection will be successful; and a list of existing connections.

19. The computer program product of claim 17, further including selecting and organizing the first set of data in the learning network.

20. The computer program product of claim 17, wherein sending the suggestion to the unconnected users includes sending the suggestion to one of the unconnected users that has more user activities than other unconnected users in the social network.

\* \* \* \* \*